United States Patent [19]

Uyeki et al.

[11] Patent Number: 5,407,130

[45] Date of Patent: Apr. 18, 1995

[54] MOTOR VEHICLE HEAT STORAGE DEVICE WITH COOLANT BYPASS

[75] Inventors: Robert M. Uyeki, Torrance; Junichi Kanemaru, Rancho Palos Verdes, both of Calif.

[73] Assignee: Honda Giken Kogyo Kabushiki Kaisha, Marysville, Ohio

[21] Appl. No.: 94,786

[22] Filed: Jul. 20, 1993

[51] Int. Cl.⁶ .............................................. B60H 1/02
[52] U.S. Cl. ......................... 237/12.3 B; 237/12.3 A; 237/12.3 R; 237/2 A; 165/42
[58] Field of Search ...................... 237/12.3 R, 12.3 A, 237/12.3 B, 2 A; 165/42

[56] References Cited

U.S. PATENT DOCUMENTS

| | | | |
|---|---|---|---|
| 4,300,720 | 11/1981 | Baier et al. | 237/12.3 |
| 4,415,847 | 11/1983 | Galloway | 320/2 |
| 4,932,465 | 5/1990 | Schatz | 165/10 |
| 4,972,901 | 11/1990 | Hormansdorfer | 165/41 |
| 4,977,952 | 12/1990 | Schatz | 165/10 |
| 5,018,490 | 5/1991 | Kroner | 123/196 |
| 5,090,475 | 2/1992 | Marx | 165/10 |
| 5,101,801 | 4/1992 | Schatz | 123/556 |
| 5,114,071 | 5/1992 | Schatz | 237/12.3 |
| 5,211,334 | 5/1993 | Schatz | 237/12.3 B |

OTHER PUBLICATIONS

SAE Technical Paper Series-910305-Cold Start Improvements With a Heat Store Feb. 25-Mar. 1, 1991-pp. 1-9.

Primary Examiner—Henry A. Bennett
Assistant Examiner—Siddharth Ohri
Attorney, Agent, or Firm—Biebel & French

[57] ABSTRACT

A vehicle heating system for use with an engine having a liquid cooling circuit in which a heat storage battery stores latent heat during the operation of the engine, and the latent heat is later used to supply heat to the engine and the passenger compartment heating system during a subsequent use of the vehicle. A bypass circuit is provided within the heating system for bypassing the heat storage battery, whereby recharging of the heat storage battery is prevented until after the engine of the vehicle has reached a desired operating temperature.

15 Claims, 5 Drawing Sheets

MOTOR VEHICLE HEAT STORAGE DEVICE WITH COOLANT BYPASS

BACKGROUND OF THE INVENTION

1. Field of the Invention

This invention is directed to motor vehicle heat storage devices and, more particularly, to motor vehicle cabin heating systems which employ a rechargeable latent heat storage device, otherwise known as a heat storage battery, for providing rapid warm up of the engine and the cabin or passenger compartment of a motor vehicle.

2. Description of Related Art

In a motor vehicle with a typical liquid cooled internal combustion engine, the cabin or passenger compartment may be heated by means of a cabin heater which includes a liquid-to-air heat exchanger or heater core. Hot coolant from the engine cooling system is supplied to the heat exchanger, and air is blown over heat transfer elements of the heat exchanger to supply warm air to the cabin interior. The capacity of the heater to warm the vehicle cabin increases as the engine of the vehicle approaches its normal operating temperature. Thus, the engine must be operated for several minutes before it can provide heated coolant for warming the cabin.

In modern motor vehicles, particularly automobiles, even though the cabin climate control systems have achieved a high degree of sophistication in maintaining a desirable temperature in the compartment, a degree of discomfort continues to exist while waiting for engine warm up. As a corollary, there is a corresponding delay in effective operation of the vehicle's windshield defrosting system.

Latent heat storage devices, such as heat storage batteries, are available which are capable of storing, and releasing upon demand, a substantial quantity of thermal energy for a period of time up to a certain period of time. Such devices provide an auxiliary source of heat to the cabin interior and windshield defrosters, or to the engine for more rapid engine warm up.

Compact latent heat storage batteries which have the capability of retaining, for a period of time, a quantity of heat in a liquid/solid medium are described, for example, in U.S. Pat. Nos. 4,932,465 of Jun. 12, 1990 and 5,114,071 of May 19, 1992.

Such heat storage batteries employ the principle of latent heat conversion. Typically, they include a plurality of individual cells which contain a medium which has a substantially high capacity for storage of latent heat in a liquid form. The medium can be readily transformed from a liquid phase to solid phase to release such latent heat and can be recharged by reheating to liquid form.

The solid/liquid phase transition temperature of the medium is typically in excess of the desired cabin ambient temperature and less than the thermostatically regulated coolant temperature. As described in the above-identified patents, a typical medium consists of a barium hydroxide salt which is characterized by a low sensible heat capacity, a high latent heat capacity, and a melting temperature of about 78° C.

Various systems have been proposed for use of such heat storage batteries for heating a cabin and/or more rapidly warming up the engine. Examples of engine warming systems using such heat storage batteries are shown in U.S. Pat. No. 5,101,801 to Schatz, issued Apr. 7, 1992. This patent discloses methods of heating an internal combustion engine by warming the air drawn into the engine with heat drawn from a heat storage means which stores heat from either the engine coolant or from the exhaust gas.

The Schatz patent further discloses that the heat storage means may be placed in a circuit with a cabin heater for the vehicle wherein a portion of the heat from the heat storage means is used to heat coolant passing through the cabin heater. In the systems disclosed in the Schatz patent, the coolant or medium warmed by the heat storage means first passes through a heat exchanger for supplying heat to the combustion air prior to flowing to the cabin heater, such that the amount of heat supplied to the cabin from the heat storage means is reduced by the amount of heat diverted to the combustion air.

It is also known to provide a cabin heating system wherein engine coolant is conveyed from a heat storage battery directly to the heat exchanger for a vehicle cabin heater and then back to the engine. While such a system is quite effective for quickly heating the vehicle cabin as well as the engine, it has been found that once the stored heat has been discharged, the heat storage medium begins to absorb heat from the coolant as the coolant temperature increases which, in turn, inhibits the rate at which the coolant temperature is increased to its final operating temperature.

In other words, due to the nature of the heat transfer medium, the heat storage battery begins to recharge itself from heat supplied by the engine coolant at an inopportune time; namely, just at the time that the coolant becomes able to take over the heating of the passenger cabin, but prior to the time when the engine and the cabin are fully warmed and window defrosting or demisting has been fully accomplished.

There accordingly exists a need for improved controls and circuitry to optimize the use of a heat storage battery in combination with a motor vehicle heating system.

SUMMARY OF THE INVENTION

It is therefore an object of the present invention to provide a vehicle heating system, including a heat storage device operating in conjunction with a coolant circuit for a vehicle engine, which optimizes the performance of a heat storage device to warm the coolant.

In particular, the motor vehicle heating system of this invention includes means by which the recharging of the heat storage device is delayed until the vehicle engine has reached a normal operating temperature and is producing a surplus of heat.

In accordance with one aspect of the present invention, a heating system is provided for use in a motor vehicle with an engine having a liquid cooling circuit, the heating system comprising: a heat storage device, a heat exchanger, a first fluid circuit for conveying coolant from the liquid cooling circuit through the heat storage device and through the heat exchanger to transfer heat from the heat storage device to the heat exchanger during a discharge mode of operation, and a bypass operatively connected to the first circuit for bypassing the heat storage device by conveying coolant from the engine directly to the heat exchanger and back to the engine during a bypass mode of operation.

In accordance with a further aspect of the invention, the heat storage device is a heat storage battery for storing latent heat, and the heat exchanger is a cabin heat exchanger or heater core for heating the passenger cabin as part of a climate control system for a vehicle.

The heating system preferably includes a control system for causing the heating system to switch from the discharge mode of operation to the bypass mode of operation in response to the control system sensing a predetermined condition for the heating system. The predetermined condition may comprise means responsive to the lapse of a predetermined time interval from the time that coolant flow in the discharge mode is first initiated, or it may comprise means for sensing that the temperature of the coolant entering the heat storage battery exceeds the temperature of the coolant leaving the heat storage battery, thus indicating that the heat storage battery has begun to recharge itself by taking heat from the coolant.

The control system further operates to sense when the temperature of the coolant passing to the cabin heat exchanger exceeds a predetermined temperature, at which time the coolant is redirected through the heat storage battery for a conventional recharge mode of operation. When the heating system then operates in the recharge mode, the coolant will contain sufficient heat to recharge the heat storage battery and to supply heat sufficient to maintain the cabin temperature.

It is accordingly an important object of this invention to provide a heat storage battery system for supplying rapid supplemental heat to the heat exchanger of the passenger compartment or cabin of a motor vehicle in which the operation of the auxiliary heating system is optimized to improve heater performance after the heat storage battery has been discharged and before it begins to recharge itself from the coolant supply.

Another object of the invention is to provide a system, as outlined above, in which a heat storage battery bypass system operates to detect the discharge of the heat storage battery, either on a timed or temperature sensed basis, for temporarily bypassing the heat storage battery during the remaining warm up cycle of the internal combustion engine, and thereafter, for redirecting coolant through the heat storage battery for recharging the heat storage battery.

Other objects and advantages of the invention will be apparent from the following description, the accompanying drawings, and the appended claims.

DESCRIPTION OF THE PREFERRED EMBODIMENT

Figure 1:
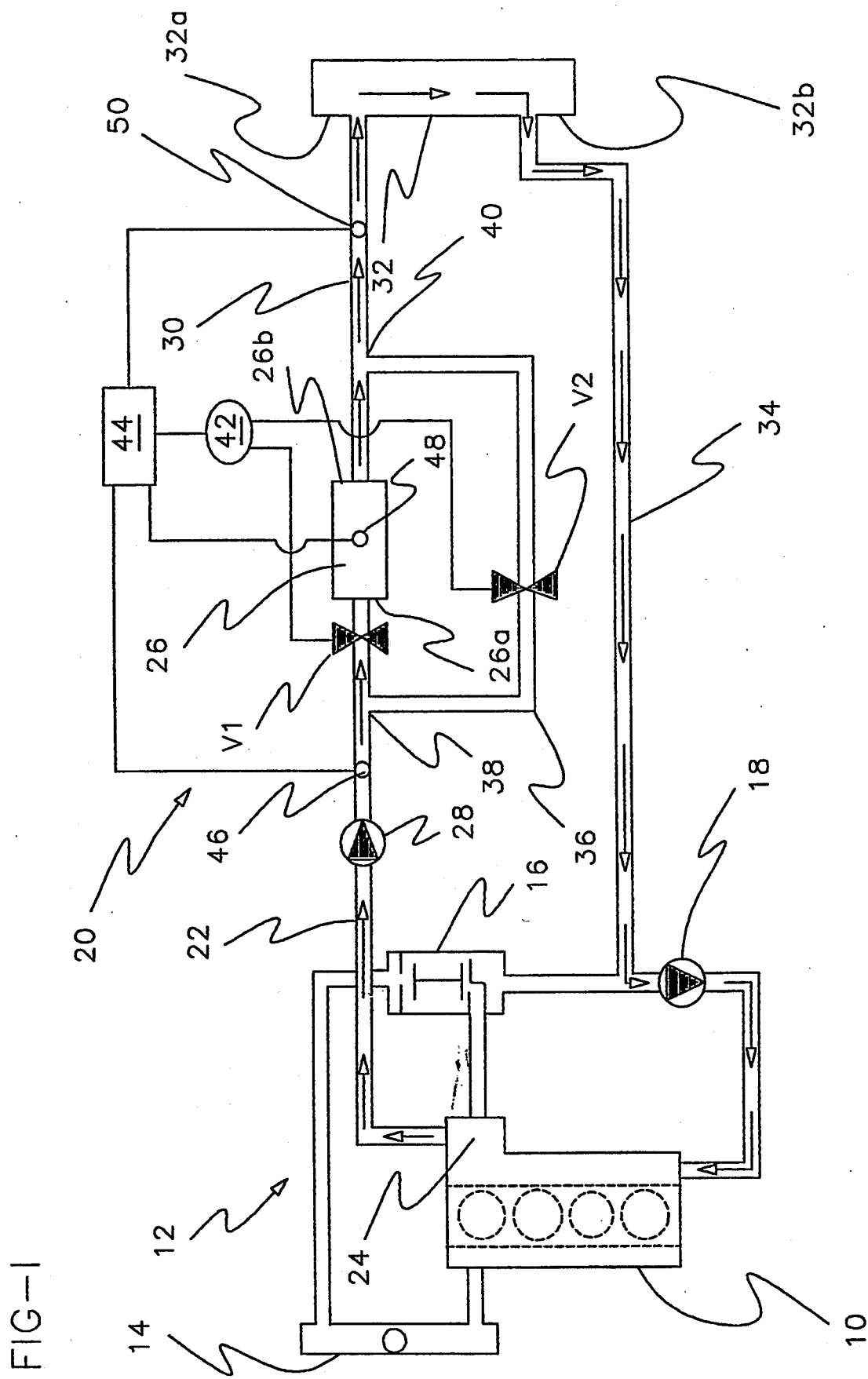
FIG. 1 is a schematic view showing the heating system of the present invention and illustrating the path followed by coolant as it flows through a first circuit of the heating system.
Figure 2:
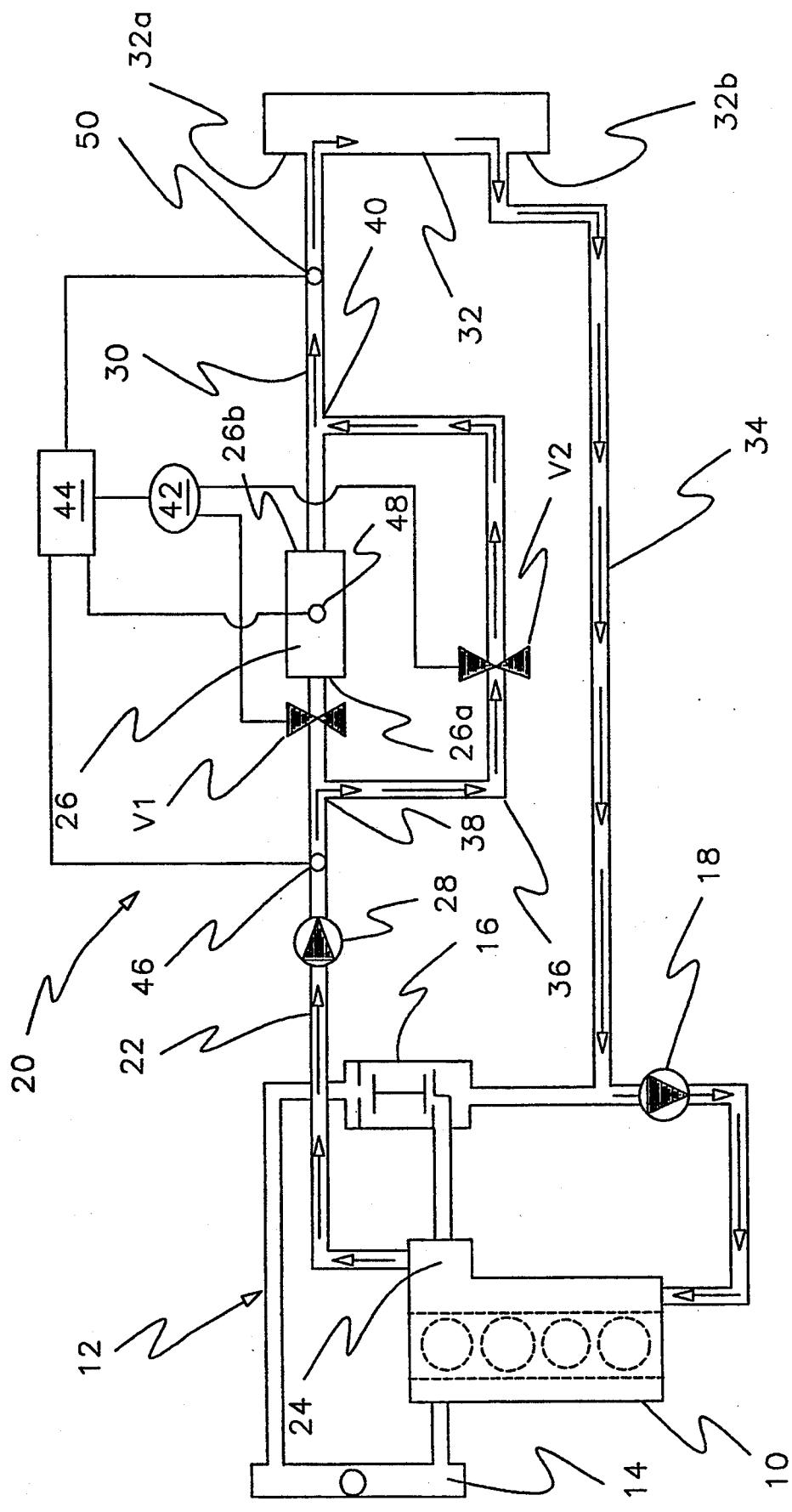
FIG. 2 is a schematic view similar to FIG. 1 in which coolant flow through a second or bypass circuit of the heating system is illustrated.

Referring to FIGS. 1 and 2, the present invention provides a heating system which is intended to be used with a vehicle having an internal combustion engine 10 including a liquid cooling system or circuit 12 for cooling the engine 10. The liquid cooling circuit 12 is conventional and includes a radiator 14, a thermostat 16 and a coolant pump 18 for circulating coolant through the cooling circuit 12.

The heating system of the present invention is generally designated 20 and includes a feed line 22 leading from a junction 24 with the cooling circuit 12. The feed line 22 conveys coolant through a heat storage device which is preferably a heat storage battery 26 for storing latent heat from the coolant for a prolonged period of time. The heat storage battery 26 may be of a type as disclosed in the previously mentioned U.S. Pat. Nos. 4,932,465 and 5,101,801 to Schatz, which patents are incorporated herein by reference.

The coolant is pumped to an inlet side 26a of the heat storage battery 26 by means of an electric pump 28 which may be activated by the ignition switch for the vehicle engine 10. After passing through the heat storage battery 26, the coolant is conveyed from an outlet side 26b of the heat storage battery 26 through an outlet line 30 to an inlet side 32a of a vehicle cabin heat exchanger 32.

The heat exchanger 32 is preferably in the form of a water-to-air heat exchanger or heater core operable for delivering heat to the passenger compartment of a vehicle. A return line 34 conveys the coolant from an outlet side 32b of the heat exchanger 32 to the cooling circuit 12 at a location upstream from the pump 18.

The heating system according to this invention further includes a bypass circuit 36 arranged generally in parallel with the heat storage battery 26. The bypass circuit 36 has an inlet end connected to the feed line 22 at a first junction 38 and an outlet end connected to the outlet line 30 at a second junction 40. In addition, a first pilot valve V1 is located in the feed line 22 between the first junction 38 and the inlet side 26a of the heat storage battery 26, and a second pilot valve V2 is located in the bypass circuit 36 between the first junction 38 and the second junction 40. The valves V1 and V2 are preferably solenoid actuated, and are under the control of a valve controller 42 which in turn is controlled by the engine control unit (ECU) 44. The engine control unit 44 is of conventional construction including a microprocessor for monitoring and controlling various functions relating to the operation of engine 10.

FIG. 1 illustrates the operation of the heating system 20 in a heat discharge mode of operation wherein the pump 28 provides coolant along a first circuit in which the coolant is heated as it passes through the heat storage battery 26, and thereafter passes through the heat exchanger 32 where at least a portion of the heat from the coolant is transferred to the passenger compartment of the vehicle. The coolant is then conveyed back to the engine cooling circuit 12 where residual heat is applied to the engine. In this mode of operation, the first valve V1 is actuated to an open position and the second valve V2 is actuated to a closed position whereby coolant is prevented from passing through the bypass circuit 36.

In order to monitor the operation of the heating system 20, a first temperature sensor 46 is provided in the feed line 22 upstream from the junction 38 for monitoring a first (upstream) temperature T1. A second temperature sensor 48 is located in the heat storage battery 26 for monitoring a second temperature T2. A third temperature sensor 50 is located in the outlet line 30 downstream from the second junction 40 for monitoring a third (downstream) temperature T3. Each of the temperature sensors 46, 48, and 50 are operatively connected to the engine control unit 44. The engine control unit 44 controls the operation of the valves V1 and V2 in response to signals received from the temperature sensors 46, 48, and 50, as will be further described below.

FIG. 2 illustrates a second circuit for the flow of coolant through the heating system 20 during a bypass mode of operation wherein the coolant follows the bypass circuit 36 bypassing the heat storage battery 26. The bypass mode of operation operates to direct coolant from the engine 10 directly to the cabin heat exchanger 32. This would be advantageous, for example, after the heat storage battery 26 has discharged its stored heat and before the engine 10 has reached its normal operating temperature. In this mode of operation, the engine control unit 44 energizes the valve controller 42 to cause the first valve V1 to be closed and the second valve V2 to be opened, whereby coolant is prevented from flowing through the heat storage battery 26. At this time, the pump 28 may be turned off, so that the pump 18 provides the driving force for coolant flow.

Figure 3:
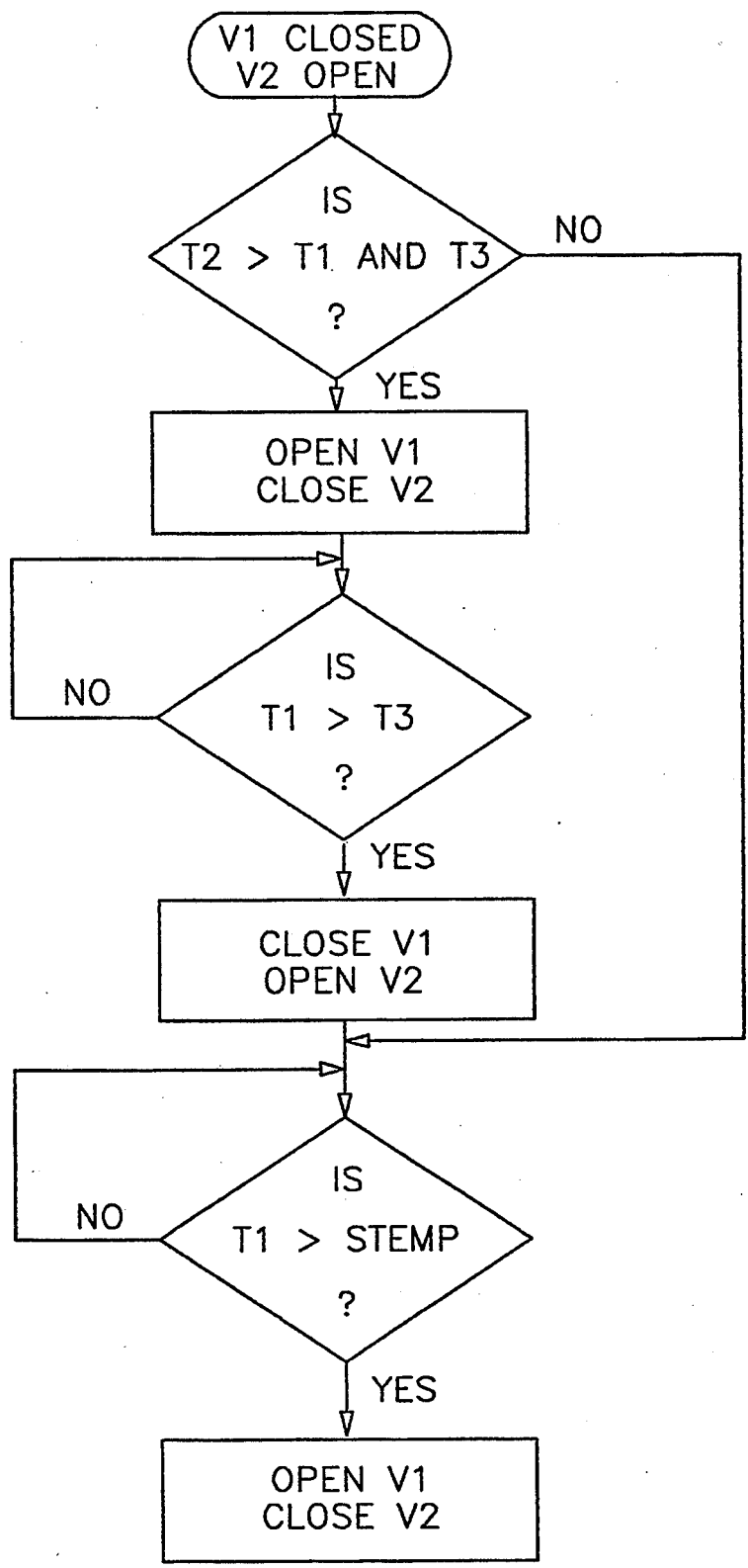
FIG. 3 is a flow diagram illustrating the sequence of operations followed by the control unit in a first embodiment for controlling the heating system.
Figure 4:
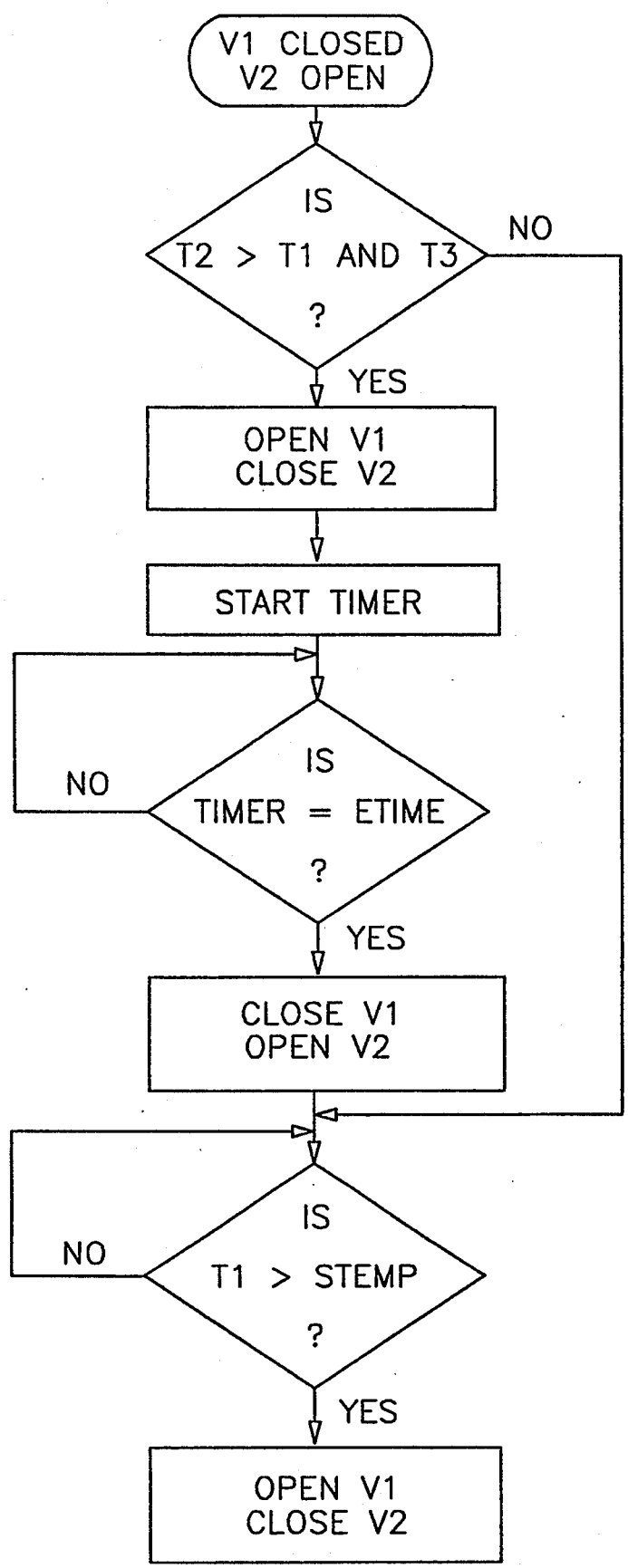
FIG. 4 is a flow diagram illustrating the sequence of operations followed by the control unit in a second embodiment for controlling the heating system.

FIGS. 3 and 4 illustrate alternative embodiments of the logic sequence followed by the engine control unit 44 in controlling the flow of coolant through the heating system 20. In both embodiments, valve V1 is initially closed and valve V2 is opened such that the coolant flow is around the heat storage battery 26 and through the bypass circuit 36. The temperature T2 within the heat storage battery 26 is compared to the upstream and downstream temperatures T1 and T3 and, if T2 is greater than T1 and T3, indicating that the heat storage battery 26 is capable of transferring heat to the coolant, then V1 is opened and V2 is closed to permit coolant flow through the first circuit, as illustrated in FIG. 1. Also, if pump 28 is not already operating, it is turned on at this time. As noted above, this flow of coolant corresponds to a discharge mode of operation wherein heat is transferred by the heat storage battery 26 to the coolant, as it flows through the heat storage battery 26.

The discharge mode of operation will continue until a predetermined condition is met corresponding to the heat storage battery 26 having discharged by transferring all or substantially all of its stored latent heat to the coolant. In the embodiment of the invention illustrated in FIG. 3, this predetermined condition is established by comparing the downstream temperature T3 to the upstream temperature T1. When the downstream temperature T3 is lower than the upstream temperature T1, the heat storage battery 26 has been discharged, and the heat storage battery 26 has begun to recharge itself from heat contained within the coolant. At this time, the engine control unit 44 will energize the valve controller 42 to cause valve V1 to be actuated to a closed position and valve V2 to be actuated to an open position. This causes the heat storage battery 26 to be bypassed thereby preventing the heat storage battery 26 from recharging itself while warm coolant is being supplied to the heat exchanger 32, as shown in FIG. 2.

During the bypass mode of operation, the upstream temperature T1 is continually monitored and compared to a set temperature STEMP, which closely corresponds to the normal operating temperature of the coolant, such as approximately 80° C. Once the temperature T1 exceeds the set temperature STEMP, the engine control unit 44 will energize the valve controller 42 to cause valve V1 to open and valve V2 to close, thereby permitting coolant to flow through the heat storage battery 26 for a recharge mode of operation, which corresponds to the flow shown in FIG. 1. In this mode of operation, the heat carried by the coolant exceeds the amount of heat required to maintain the desired operating temperature of the cabin, and this excess heat may now be extracted for recharging the heat storage battery 26. Thus, the efficiency of the heating system 20 is increased by isolating the heat storage battery 26 from the coolant passing to the heat exchanger 32 once the heat storage battery 26 has been discharged, and heat transferred to the coolant by the engine 10 is not extracted by the heat storage battery 26 until the engine 10 and the coolant passing therethrough reach a normal operating temperature.

It should be noted that the present invention contemplates a further embodiment, as illustrated in FIG. 4, wherein the predetermined condition for terminating the discharge mode of operation is established by measuring the elapsed time interval of coolant flow through the heat storage battery 26. In this embodiment, engine control unit 44 directs the coolant flow through the bypass circuit 36 after a predetermined time interval ETIME has elapsed. For example, the engine control unit 44 may permit coolant flow through the heat storage battery 26 for a time interval ETIME of approximately 2.5 minutes, at which time valve V1 is closed and valve V2 is opened to begin the bypass mode of operation. It should be understood that the time interval ETIME for flow in the discharge mode of operation will depend on various factors and is preferably set to maximize the discharge of the heat storage battery 26.

Figure 5:
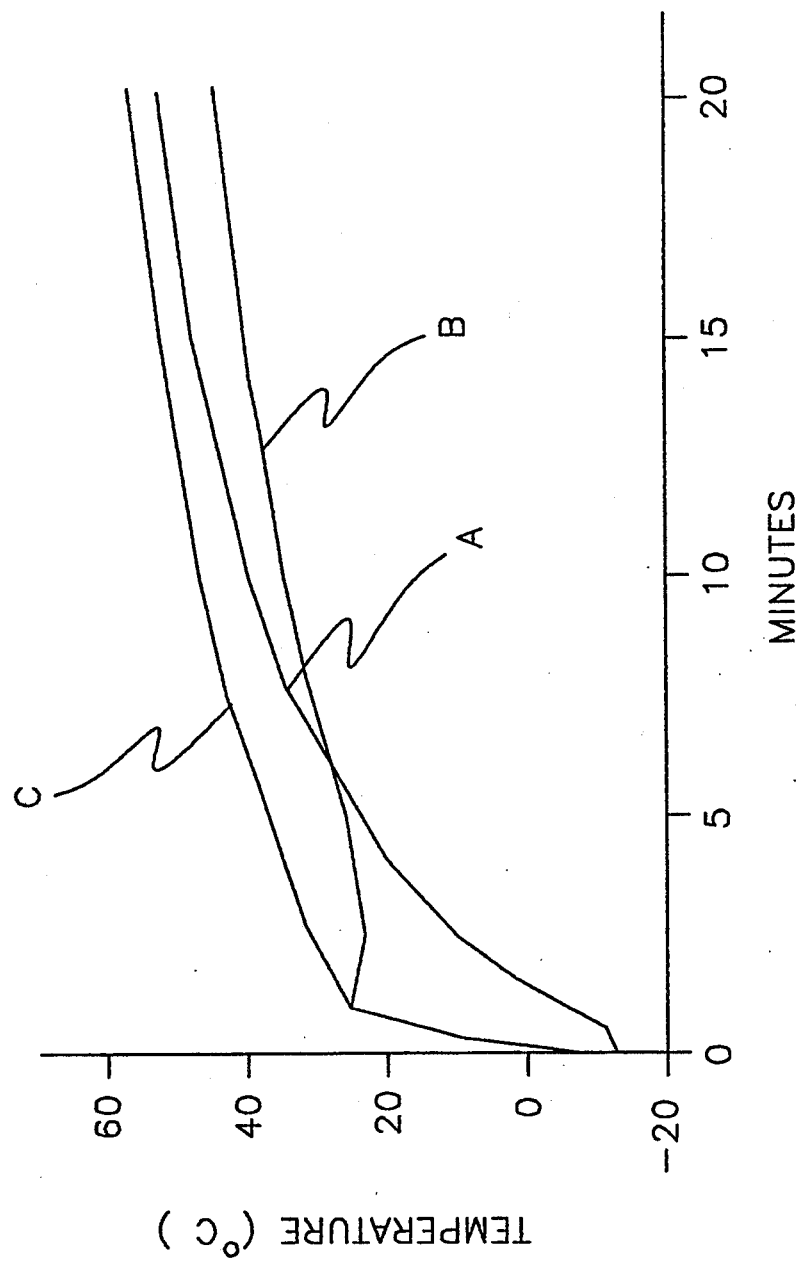
FIG. 5 is a graph illustrating the heating system performance for a heating system having a heat storage battery and bypass circuit as compared to the performance of a system in which the heat storage battery remains connected in series flow relation to the heater.

FIG. 5 illustrates the temperature profile of the heating system of the present invention as compared to prior art heating systems. Line A in the graph illustrates a standard heating system without the benefit of a heat storage battery and line B illustrates a heating system incorporating a heat storage battery but without a bypass circuit. It should be noted that although the system with a heat storage battery initially warms up more quickly than a standard system, the temperature of the heat storage battery system drops below that of a standard system after approximately six minutes. This is due to the heat storage battery beginning to recharge itself from engine heat supplied by the coolant which results in a delay in the coolant reaching its final optimum operating temperature. In contrast, line C illustrates a system having a heat storage battery and bypass circuit in accordance with this invention. It can be seen that the present heating system provides an initial quick heating for the coolant, followed by a gradual climb which remains above the temperatures provided by a standard heating system.

From the above description, it should be apparent that the present invention provides a heating system for increasing the efficiency of a heat storage battery used to heat the system. In particular, an effective control system is provided whereby coolant is bypassed around a heat storage battery subsequent to discharge of the heat storage battery in order to maximize the rate at which coolant used for a vehicle heating system is heated to a normal operating temperature.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A heat system for use with an engine having a liquid cooling circuit, said heating system comprising:
   a heat storage device,
   a heat exchanger,
   a first fluid circuit for conveying coolant from said liquid cooling circuit through said heat storage device and said heat exchanger and back to said liquid cooling circuit to transfer heat to said coolant during a heat discharge mode of operation,
   a bypass circuit operatively connected to said first fluid circuit for bypassing said heat storage device said heat exchanger and back to said liquid cooling circuit during a bypass mode of operation,
   a first temperature sensor located between said engine and said heat storage device for measuring an upstream temperature, and
   a second temperature sensor located between said heat storage device and said heat exchanger for measuring a downstream temperature.

2. The heating system as in claim 1 including a control system for causing said heating system to change from said heat discharge mode of operation to said bypass, mode of operation when said upstream temperature exceeds said downstream temperature.

3. The heating system of claim 1 further comprising means for reestablishing said flow through said first fluid circuit to recharge said heat storage device in response to said first temperature sensor sensing a predetermined maximum temperature indicative of said engine having reached a desired operating temperature.

4. A heating system for use with an engine having a liquid cooling circuit, said heating system comprising:
   a heat storage device having an inlet side and an outlet side, said inlet side being in fluid communication with said liquid cooling circuit and said heat storage device being adapted to retain heat for a predetermined period of time,
   a heat exchanger operable for delivering heat to a passenger compartment of a vehicle, said heat exchanger having an inlet side and an outlet side, inlet side of said heat exchanger being in fluid communication with said outlet side of said heat storage device for receiving liquid coolant heated by said heat storage device,
   a bypass circuit having an inlet end in fluid communication with said inlet side of said heat storage device and an outlet end in fluid communication with said inlet side of said heat exchanger, said bypass circuit forming a path for liquid coolant to flow around said heat storage device from said liquid cooling circuit to said heat exchanger, and
   a valve means selectively operable for selectively directing coolant from said engine through either said heat storage device or said bypass circuit.

5. The heating system as in claim 4 wherein said valve means comprises a first valve for controlling flow of coolant to said heat storage device and a second valve for controlling flow of coolant through said bypass circuit.

6. The heating system as in claim 5 wherein said first valve is located adjacent to said inlet side of said heat storage device and said second valve is located within said bypass circuit.

7. The heating system as in claim 6 including a feed line which is suitable for supplying coolant from said liquid cooling circuit to said inlet side of said heat storage device and said inlet end of said bypass circuit being connected to said feed line upstream of said first valve.

8. The heating system as in claim 6 including a pump for pumping coolant through said heat storage device wherein said first valve is located in a fluid line between said pump and said heat storage device.

9. A heat system for use with an engine having a liquid cooling circuit, said heating system comprising:
   a heat storage device having an inlet side and an outlet side, said inlet side being in fluid communication with said liquid cooling circuit and said heat storage device being adapted to retain heat for a predetermined period of time,
   a heat exchanger operable for delivering heat to a passenger compartment of a vehicle, said heat exchanger having an inlet side and an outlet side, said inlet side of said heat exchanger being in fluid communication with said outlet side of said heat storage device for receiving liquid coolant heated by said heat storage device, and
   a bypass circuit having an inlet end in fluid communication with said inlet side of said heat storage device and an outlet end in fluid communication with said inlet side of said heat exchanger, said bypass circuit forming a path for liquid coolant to flow around said heat storage device from said liquid cooling circuit to said heat exchanger,
   a first temperature sensor located adjacent to said inlet side for sensing an inlet temperature of coolant at said inlet side of said heat storage device,
   a second temperature sensor located adjacent to said outlet side of said heat storage device for sensing an outlet temperature of coolant at said outlet side of said heat storage device,
   a temperature sensor located within said heat storage device for sensing a heat storage device temperature, and
   a control unit connected to said sensors for directing flow of coolant through said heat storage device when said inlet and outlet temperatures are both less than said heat storage device temperature and for directing flow of coolant through said bypass circuit when said inlet temperature is greater than said outlet temperature.

10. A vehicle heating system for use with an engine having a liquid cooling circuit, said vehicle heating system comprising:
    a heat storage battery having an inlet side and an outlet side, said heat storage battery being adapted to retain heat for a prolonged period of time,
    a feed line extending from said liquid cooling circuit to said inlet side of said heat storage battery for supplying coolant to said heat storage battery,
    a heat exchanger operable for delivering heat to the passenger compartment of a vehicle, said heat exchanger having an inlet side and an outlet side,
    an outlet line extending from said outlet side of said heat storage battery to said inlet side of said heat exchanger for supplying heated coolant from said heat storage battery to said heat exchanger, a return line extending from said outlet side of said heat exchanger to said liquid cooling circuit for returning coolant from said heat exchanger to said liquid cooling circuit, a bypass circuit having an inlet end connected in fluid communication with said feed line at a first junction and connected in fluid communication with said outlet line at a second junction, a first valve located in said feed line between said first junction and said inlet side of said heat storage battery, a second valve located in said bypass circuit between said first junction and said second junction, a pump located in said feed line between said liquid cooling circuit and said first valve for pumping coolant through said feed line to said heat storage battery, a first temperature sensor located in said feed line for sensing a first temperature, a second temperature sensor located in said heat storage battery for sensing a second temperature, a third temperature sensor located in said outlet line for sensing a third temperature, a control unit for receiving inputs from said temperature sensors and for controlling actuation of said first and second valves in a manner such that said control unit opens said first valve and closes said second valve when said second temperature is greater than both said first and third temperatures to supply heat from said heat storage battery to said heat exchanger during a discharge mode of operation, closes said first valve and opens said second valve upon the occurrence of a predetermined condition to commence a bypass mode of operation, and thereafter opens said first valve and closes said second valve to begin a recharge mode of operation to recharge said heat storage battery when said first temperature exceeds a predetermined temperature.

11. The vehicle heating system as in claim 10 including means in said control unit for comparing said first temperature to said third temperature wherein said predetermined condition comprises said first temperature being greater than said third temperature.

12. The vehicle heating system as in claim 10 including means in said control unit for measuring a predetermined time interval wherein said predetermined condition comprises said predetermined time interval elapsing from the time that coolant flow through said heat storage battery is initiated.

13. A method for facilitating the heating of an engine and a passenger compartment in an automobile having a liquid cooling circuit, said method comprising the steps of:

(a) directing coolant to flow through a heat storage battery in a heating system connected to said liquid cooling circuit, and (b) bypassing said heat storage battery upon the occurrence of a predetermined condition.

14. The method as in claim 13 wherein said predetermined time is approximately 2.5 minutes.

15. A method for facilitating the heating of an engine and a passenger compartment in an automobile having a liquid cooling circuit, said method comparing the steps of:

(a) directing coolant to flow through a heat storage battery in a heating system connected to said liquid cooling circuit, (b) determining when said coolant has been flowing through said heat storage battery for more than a predetermined time, and (c) bypassing said heat storage battery upon the occurrence of said coolant flowing through said heat storage battery for more than said predetermined time.

* * * * *

UNITED STATES PATENT AND TRADEMARK OFFICE
CERTIFICATE OF CORRECTION

PATENT NO. : 5,407,130
DATED : April 18, 1995
INVENTOR(S) : Robert M. Uyeki and Junichi kanemaru It is certified that error appears in the above-indentified patent and that said Letters Patent is hereby corrected as shown below:

Column 7, between lines 20 & 21 insert:

--by conveying coolant from said liquid cooling circuit to--

Signed and Sealed this

Twenty-fifth Day of July, 1995

Attest:

BRUCE LEHMAN

*Attesting Officer*    *Commissioner of Patents and Trademarks*